United States Patent
Wang et al.

(10) Patent No.: US 7,738,072 B2
(45) Date of Patent: Jun. 15, 2010

(54) LIQUID CRYSTAL DISPLAY ARRAY SUBSTRATE AND ITS MANUFACTURING METHOD

(75) Inventors: Yeong-Feng Wang, Hsin-Chu (TW); Liang-Bin Yu, Hsin-Chu (TW); Chih-Jui Pan, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 681 days.

(21) Appl. No.: 11/566,724

(22) Filed: Dec. 5, 2006

(65) Prior Publication Data

US 2007/0258035 A1 Nov. 8, 2007

(30) Foreign Application Priority Data

May 2, 2006 (TW) ............................. 95115636 A (51) Int. Cl.
*G02F 1/13* (2006.01)
*G02F 1/1343* (2006.01)

(52) U.S. Cl. ..................... 349/187; 349/147; 349/148

(58) Field of Classification Search ................. 349/147, 349/148
See application file for complete search history.

(56) References Cited

U.S. PATENT DOCUMENTS 4,938,567 A * 7/1990 Chartier ....................... 359/245
6,078,365 A * 6/2000 Ueda et al. .................... 349/43
6,712,666 B2 * 3/2004 Wu ............................. 445/24
7,414,679 B2 * 8/2008 Tseng ......................... 349/55
7,436,474 B2 10/2008 Kim
2002/0048834 A1 4/2002 French et al.
2002/0113934 A1 8/2002 Aoki
2003/0112382 A1 * 6/2003 Takahashi et al. ............. 349/43
2005/0073619 A1 4/2005 Chen et al.
2005/0285987 A1 * 12/2005 Azumada et al. ............. 349/43
2006/0044487 A1 * 3/2006 Okada et al. .................. 349/46
2009/0032818 A1 2/2009 Kim

FOREIGN PATENT DOCUMENTS

JP    H01-134341    5/1989
JP    2004-199074   7/2004

OTHER PUBLICATIONS

English language translation of abstract of JP H01-134341 (published May 26, 1989).
English language translation of abstract and pertinent parts of JP 2004-199074 (published Jul. 15, 2004).

* cited by examiner

*Primary Examiner*—Uyen-Chau N Le
*Assistant Examiner*—Chris H Chu
(74) *Attorney, Agent, or Firm*—Thomas, Kayden, Horstemeyer & Risley (57) ABSTRACT

A liquid crystal display (LCD) array substrate and its manufacturing method are provided. Scan lines and data lines of the LCD array substrate are composed of two conductive layers to decrease their RC delay. Moreover, the dielectric layer and even the planarization layer are removed from pixel areas defined by the scan lines and the data lines to increase the light penetration percentage.

11 Claims, 6 Drawing Sheets

LIQUID CRYSTAL DISPLAY ARRAY SUBSTRATE AND ITS MANUFACTURING METHOD

RELATED APPLICATIONS

The present application is based on, and claims priority from, Taiwan Application Serial Number 95115636, filed May 2, 2006, the disclosure of which is hereby incorporated by reference herein in its entirety.

BACKGROUND

1. Field of Invention

The present invention relates to a liquid crystal display (LCD). More particularly, the present invention relates to an LCD array substrate and its manufacturing method.

2. Description of Related Art

With progress in LCD technology and an increased demand for large-scale displays, both the size and resolution of LCD screens are continually increasing. An increase in both the resistance and the capacitance of the conductive lines of the LCD is required to increase the LCD resolution. Increasing the resistance and the capacitance of the conductive lines worsen the resistance-capacitance time delay (RC delay) problem in LCD. The RC delay problem affects both signal transfer in the LCDs and the LCD display quality.

Traditional methods to reduce RC delay mainly include using a copper process and broadening the width of the conductive lines. The resistance of the conductive line can be reduced to improve the signal transfer rate by introducing the copper process of manufacturing copper conductive line to the LCD manufacturing processes. Therefore, the RC delay is also reduced. However, the copper process has many problems remained to be solved. Another method to solve the RC delay problem is to broaden the width of the conductive lines. The cross-sectional area of the conductive lines is increased by broadening the width of the conductive lines. Therefore, the resistance of the conductive lines is decreased, and the RC delay is reduced. However, the size of the pixel areas is influenced by broadening the conductive line width, and thus the aperture ratio and the brightness of the LCDs are decreased.

Each LCD pixel area is composed of many different functional thin layers. Each thin layer has a different reflective index. The reflective index for each thin layer is different from the reflective indices for the other thin layers. Because different thin layers have different reflective indices, when light passes through interfaces of the different thin layers, a portion of the light is easily reflected, and the transmittance of the light is decreased. Therefore, the brightness of the LCDs is decreased. The LCDs need to use high brightness backlight modules to generate the required display brightness.

SUMMARY

It is therefore an aspect of the present invention to provide a LCD array substrate, which can reduce the RC delay of conductive lines and won't affect the aperture ratio of the LCD.

It is another aspect of the present invention to provide a manufacturing method of a LCD array substrate. The amount of light passing through the pixel areas and the brightness of the LCD can be increased by using this method.

In accordance with the foregoing and other aspects of the present invention, a LCD array substrate is provided. The array substrate of the LCD comprises a first conductive line, two second conductive lines, a signal dielectric layer, two third conductive lines, a fourth conductive line, a transistor and a pixel electrode. The first conductive line is on a substrate and has a crossing region. The two second conductive lines are on the substrate. The two second conductive lines are separately located at two sides of the crossing region and are perpendicular to the first conductive line. The signal dielectric layer is on the second conductive lines and in the crossing region, wherein the signal dielectric layer on the second conductive lines has a first opening to expose the second conductive lines. The two third conductive lines cover the first conductive line at the two sides of the crossing region to form a scan line. The fourth conductive line covers the signal dielectric layer and the first opening to form a data line. The third conductive lines don't electrically connect with the fourth conductive line. A source electrode of the transistor electrically connects with the fourth conductive line. A gate electrode of the transistor electrically connects with the first conductive line. The pixel electrode electrically connects with a drain electrode of the transistor.

In accordance with the foregoing and other aspects of the present invention, a manufacturing method of a LCD array substrate is provided. Firstly, a patterned first metal layer is formed on a substrate to form a first conductive line, two second conductive lines and a gate electrode. The first conductive line has a crossing region and electrically connects with the gate electrode. The second conductive lines are located separately at two sides of the crossing region of the first conductive line. Secondly, a dielectric layer and a semiconducting layer are sequentially formed and patterned to cover the second conductive lines, the crossing region and the gate electrode. The dielectric layer and the semiconducting layer on the second conductive lines have a first opening to expose the second conductive lines. The semiconducting layer above the gate electrode is used as a channel layer. Thirdly, a patterned second metal layer is formed over the substrate to separately form two third conductive lines, a fourth conductive line, a source electrode and a drain electrode. The third conductive lines cover the two sides of the crossing region of the first conductive line to form a scan line. The fourth conductive line covers the semiconducting layer on the second conductive lines and the cross region to form a data line. The source electrode and the drain electrode located at two sides of the channel layer form a transistor. The third conductive lines don't connect with the fourth conductive line. Fourthly, a patterned passivation layer is formed to cover the transistor, the scan line and the data line. Finally, a pixel electrode is formed over the substrate. The pixel electrode electrically connects with the transistor.

In the structure of the LCD array substrate of the invention, the thickness of both scan lines and data lines is increased, so the cross-sectional area of the scan lines and the data lines is increased. Therefore, the resistance of the conductive lines is decreased, and the RC delay problem to pixel display quality is solved. Moreover, the occupied area of both the scan lines and the data lines on the substrate is still the same and won't affect the size of the pixel areas on the substrate.

In the structure of the LCD array substrate of the invention, the dielectric layer is only on the conductive lines. There is no dielectric layer on the pixel areas. Therefore, the number of layers light needs to pass through is decreased, and the transparency of the pixel area is increased. The brightness of the LCDs is thus increased.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Embodiment 1

Figures 1A, 1B:
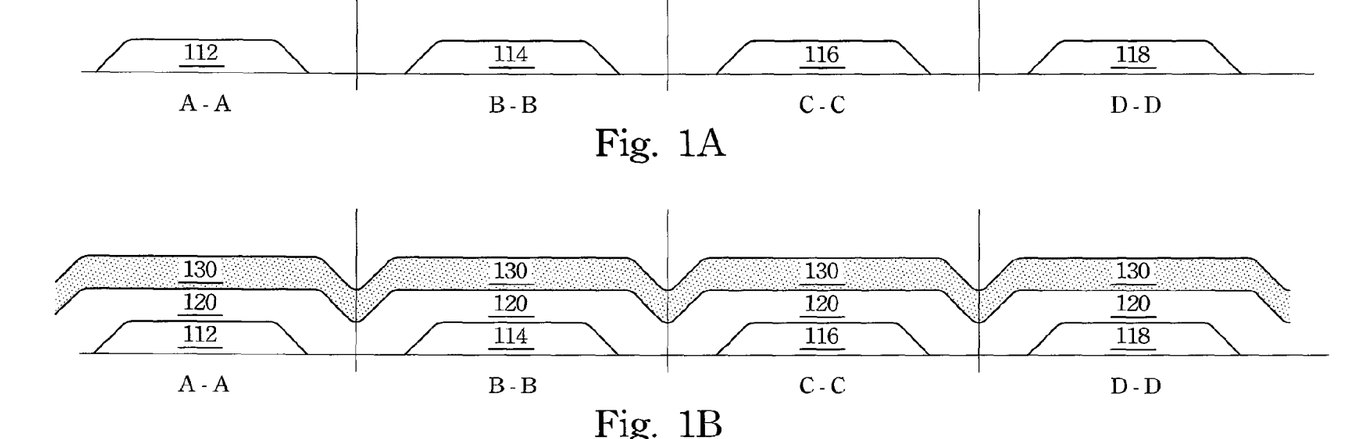
FIGS. 1A-1E are cross-sectional views of the LCD array substrate in process steps according to one preferred embodiment of this invention.
Figure 2A:
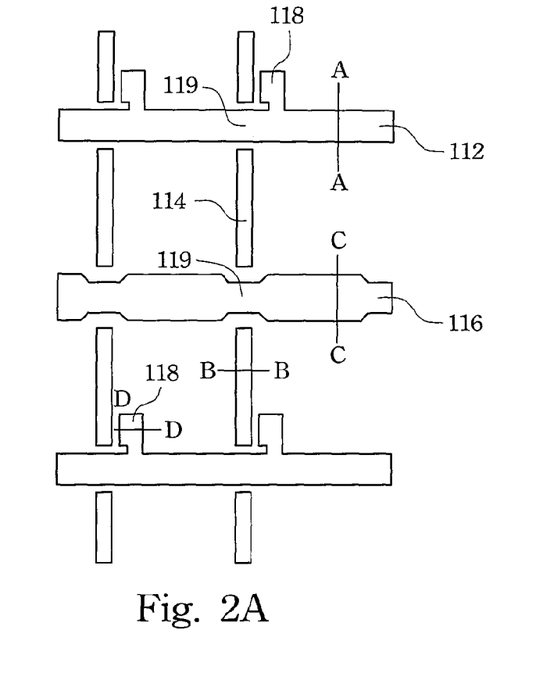
FIGS. 2A-2D are top views of the LCD array substrate in process steps according to one preferred embodiment of this invention.

Please refer to FIG. 1A and FIG. 2A simultaneously. FIG. 1A shows the cross-sectional view of a scan line, (taken along line A-A of FIG. 2A), the cross-sectional view of a data line (taken along line B-B of FIG. 2A), the cross-sectional view of a capacitance line (taken along line C-C of FIG. 2A), and the cross-sectional view of a gate electrode (taken along line D-D of FIG. 2A). At first, a first metal layer is formed on a transparent substrate (not shown in FIG. 1A and FIG. 2A). The first metal layer is defined to form first scan lines 112, first data lines 114, capacitance lines 116 and gate electrodes 118. In FIG. 2A, the first scan lines 112 are parallel to the capacitance lines 116. Both the first scan lines 112 and the capacitance lines 116 have crossing regions 119, respectively. The first data lines 114 are perpendicular to both the first scan lines 112 and the capacitance lines 116. The first data lines 114 are located separately at two sides of the crossing regions 119 of both the first scan lines 112 and the capacitance lines 116. The first data lines 114 don't connect with the crossing regions 119. The first scan lines 112 and the first data lines 114 on the substrate define the pixel areas.

Please refer to FIG. 1B. A dielectric layer 120 and a semiconducting layer 130 are sequentially formed over the substrate to cover the first scan lines 112, the first data lines 114, the capacitance lines 116 and the gate electrodes 118. In a preferred embodiment, the semiconducting layer 130 comprises an amorphous silicon layer and an n-type doped amorphous silicon layer thereon.

Figure 1C:
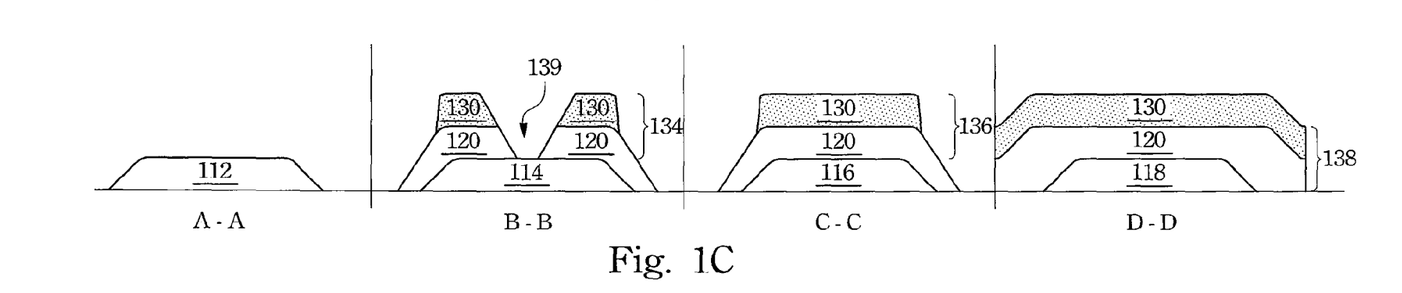
Figure 2B:
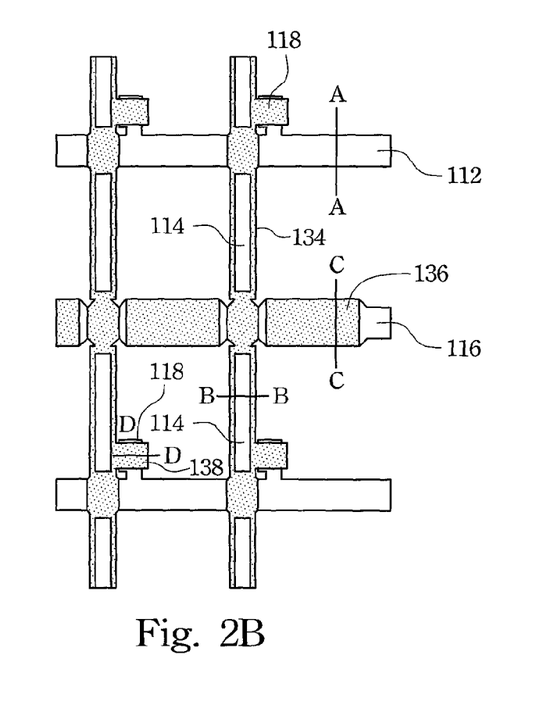

Please refer to FIG. 1C and FIG. 2B simultaneously. FIG. 2B is the top view of FIG. 1C. In FIG. 1C and FIG. 2B, the dielectric layer 120 and the semiconducting layer 130 are defined to form signal dielectric layers 134, capacitance dielectric layers 136 and channel layers 138. The signal dielectric layers 134 are located on the first data lines 114 and in the crossing regions 119. The capacitance dielectric layers 136 are located on the capacitance lines 116. The channel layers 138 are located above the gate electrodes 118. Each of the signal dielectric layer 134 on the first data lines 114 has an opening 139 to expose the first data lines 114. The signal dielectric layers 134 don't connect with the capacitance dielectric layers 136. Because the dielectric layer and the semiconducting layer on the pixel areas defined by the first scan lines 112 and the first data lines 114 are removed totally, the number of thin film layers that light needs to pass through is decreased and thus the transparency of the pixel areas is increased.

Figure 1D:
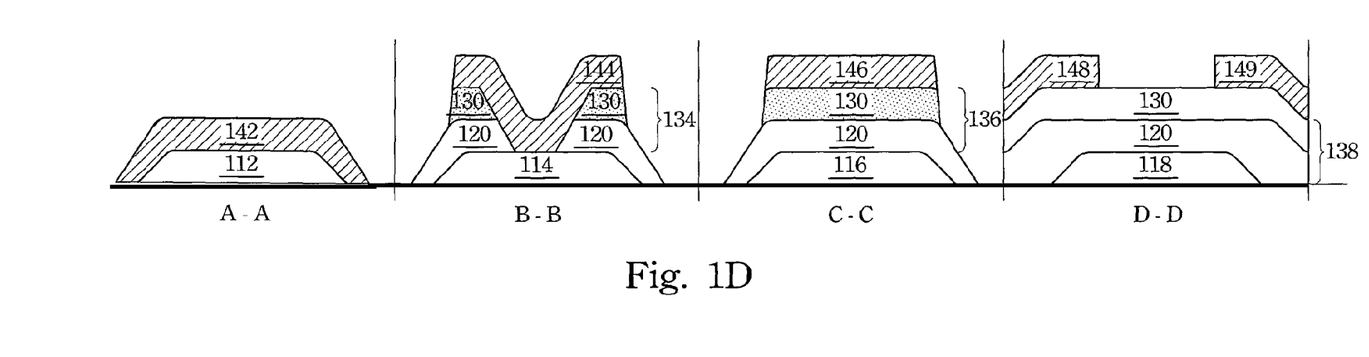
Figure 2C:
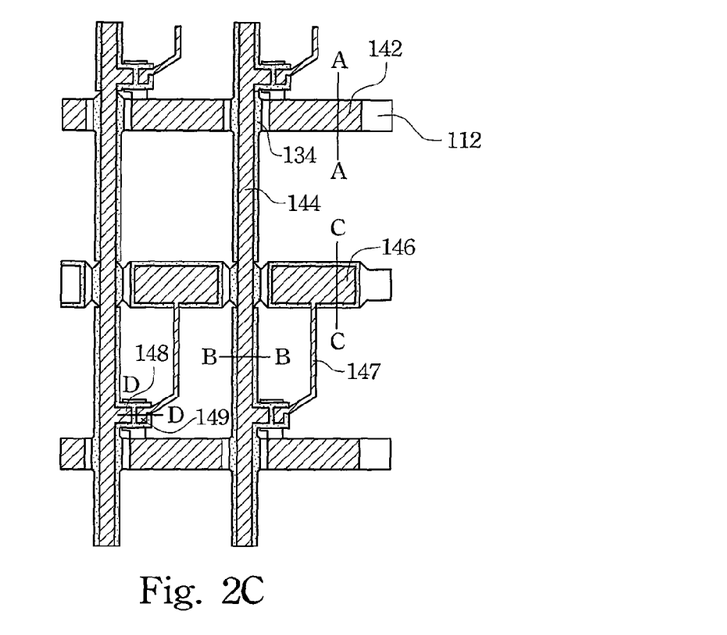

Please refer to FIG. 1D and FIG. 2C simultaneously. FIG. 2C is the top view of FIG. 1D. After defining the semiconducting layer and the dielectric layer, a second metal layer is formed thereon. Then, the second metal layer is defined to form second scan lines 142, second data lines 144, upper electrodes 146, source electrodes 148, drain electrodes 149 and connecting lines 147. The second scan lines 142 cover the exposed first scan lines 112 at two sides of the crossing region 119. The second data lines 144 cover the signal dielectric layers 134 and the openings 139. The upper electrodes 146 are located on the capacitance dielectric layers 136 at two sides of the crossing region 119. The source electrodes 148 and the drain electrodes 149 are located at two sides of the channel layer 138. The connecting lines 147 are used to connect the upper electrodes 146 and the drain electrodes 149.

The second scan lines 142 and the first scan lines 112 connect directly to form scan lines, which have double-layer metal structure. The second data lines 144 and the first data lines 114 connect directly through the openings 139 to form data lines, which also have double-layer metal structure. The signal dielectric layers 134 in the crossing regions 119 are used to electrically insulate the second data lines 144 from the both the first scan lines 112 and the capacitance lines 116. The gate electrodes 118, the source electrodes 148 and the drain electrodes 149 form the three electrodes of the transistors. The capacitance lines 116, the capacitance dielectric layers 136 and the upper electrodes 146 form storage capacitances.

Figure 1E:
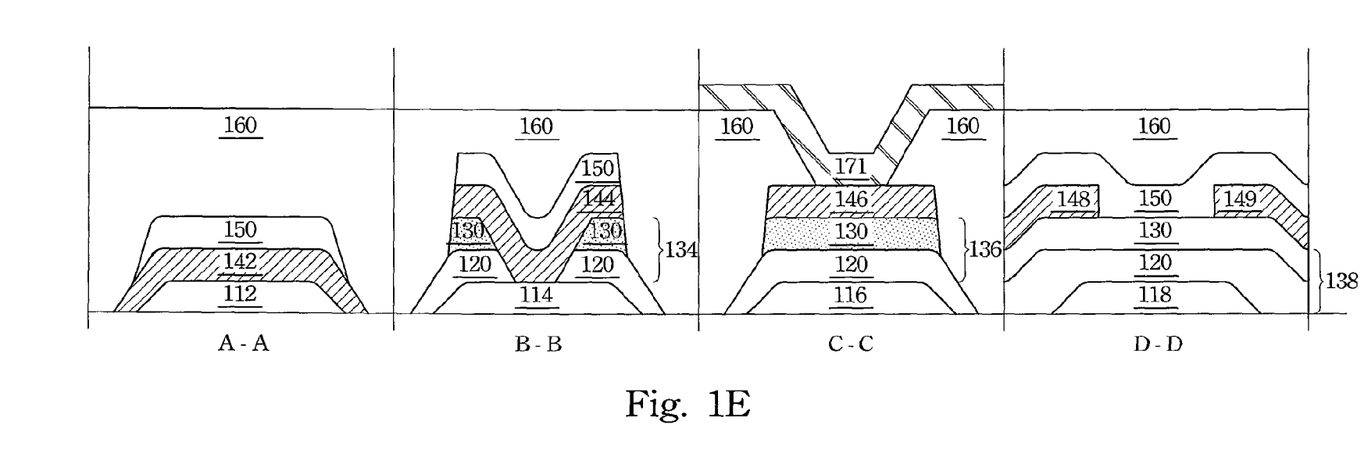
Figure 2D:
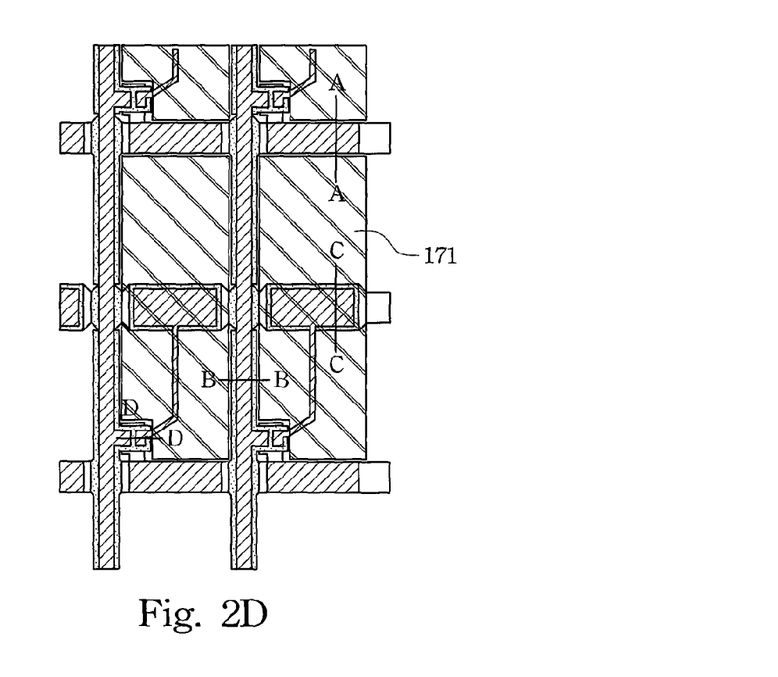

Please refer to FIG. 1E and FIG. 2D simultaneously. FIG. 2D is the top view of FIG. 1E. In FIG. 1E and FIG. 2D, a passivation layer 150 is formed and defined to cover the second scan lines 142, the second data lines 144, the source electrodes 148 and the drain electrodes 149 to protect them from oxidizing, while the passivation layer 150 on the pixel regions and upper electrodes 146 is remove simultaneously.

Then, a planarization layer 160 is formed over the substrate and defined to expose the upper electrodes 146.

Finally, the transparent conducting layer is formed and defined to form the pixel electrodes 171, which connect with the upper electrodes 146, on the pixel areas. In this embodiment, the pixel electrodes 171 connect with the drain electrodes 149 through the upper electrodes 146 and connecting lines 147. Each of the pixel electrodes 171 is independent and doesn't connect with other pixel electrodes. In the LCD array substrate of the invention, both scan lines and data lines are composed of two metal layers. The scan lines are composed of the first scan lines and the second scan lines. The data lines are composed of the first data lines and the second data lines. The thicknesses of the scan lines and the data lines are increased, so the cross-sectional areas thereof are also increased. Therefore, the resistance of the scan lines and data lines is decreased and the RC delay problem to pixel display quality is solved. Moreover, because the occupied area of the scan lines and data lines is still the same, the aperture ratio of the LCDs won't be affected.

Conventionally, light has to pass the substrate, the dielectric layer, the planarization layer and the transparent conducting layer to pass through the pixel areas. However, the reflective index of each layer is different from each other, and a portion of the light is lost because reflection or refraction will be incurred when the light passes through interfaces of different thin layers. In the embodiment, the dielectric layer, which has the highest reflective index among the thin layers constructing the pixel area, is removed from the pixel areas, so the difference between the reflective indexes among the thin layers is decreased. The number of layers that the light needs to pass is reduced from five to three, and the number of interfaces that the light needs to pass through is reduced from four to two. The likelihood of the light reflected at the interfaces is reduced, and the light loss is decreased when the light passes through the pixel areas. Therefore, the brightness of the final LCD product of the invention is thus improved.

Embodiment 2

In embodiment 2, the planarization layer of the embodiment 1 is omitted, so there are some corresponding adjustments on some structures of the LCD array substrate. With the exception of no upper electrodes forming on the capacitance dielectric layer when the second metal layer is defined, all processes from the formation of the first metal layer to the formation of the passivation layer in the embodiment 2 are the same as those in the embodiment 1.

Figure 3A:
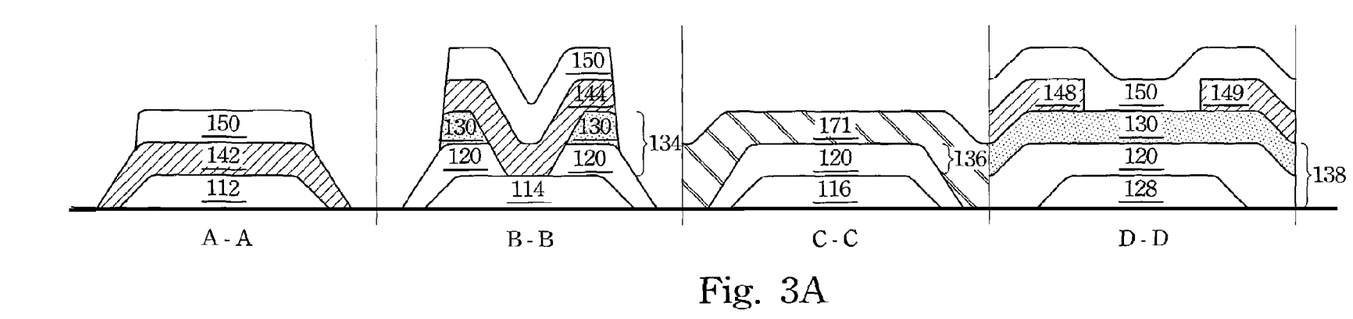
FIG. 3A is a cross-sectional view of the LCD array substrate in process steps according to another preferred embodiment of this invention.
Figure 3B:
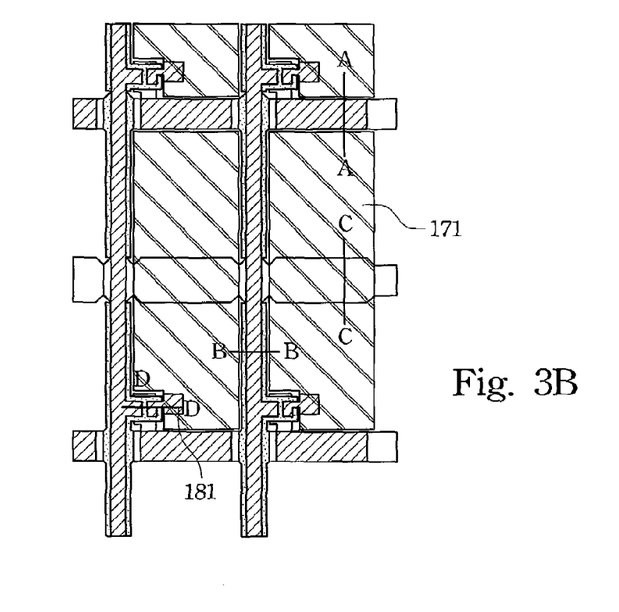
FIG. 3B is a top view of the LCD array substrate in process steps according to another preferred embodiment of this invention.

Please refer to FIG. 3A and FIG. 3B simultaneously. FIG. 3B is the top view of FIG. 3A. After the passivation layer 150 is formed over the substrate, the passivation layer 150 is defined to cover the second scan lines 142, the second data lines 144, the source electrode 148 and the drain electrodes 149. Then, the transparent conducting layer is formed and defined to form the pixel electrodes 171. The pixel electrodes 171 connect with the drain electrodes 149 of the transistors through the connecting points 181.

When the passivation layer 150 is defined, because there are no upper electrodes on the dielectric capacitance layers, the semiconducting layer 130 on the capacitance line 116 can be removed by etching to leave the dielectric layer 120 on the capacitance lines 116. Therefore, the storage capacitances are composed of the capacitance lines 116, the dielectric layers 120 and the pixel electrodes 171 in FIG. 3A. The capacitance lines 116, the dielectric layers 120 and the pixel electrodes 171 are the lower electrodes, the capacitance dielectric layers and the upper electrodes of the storage capacitances, respectively. In the embodiment 1, the capacitance dielectric layer of the storage capacitance is composed of the dielectric layer and the semiconducting layer. In the embodiment 2, the capacitance dielectric layer of the storage capacitance is only composed of the dielectric layer. The capacitance dielectric layer of the storage capacitance of the embodiment 2 is thinner than that of the embodiment 1. Therefore, the storage capacitance of the embodiment 2 can store more electricity than the storage capacitance of the embodiment 1.

Because the planarization layer is omitted in the embodiment 2, the light only needs to pass through the substrate and the transparent conducting layer to pass through the pixel areas. Both the number of thin layers and the number of interfaces the light needs to pass through are decreased. The loss of light when the light passes through the interfaces is thus decreased.

Embodiment 3

Because the transparent conducting layer has the property of the conductor, the transparent conducting layer can be used to replace the second metal layer of embodiment 2. Therefore, not only the planarization but also the second metal layer is omitted in embodiment 3. In this embodiment, the transparent conducting layer can be used not only as the pixel electrodes but also as the conductive lines. Moreover, the number of the required masks in the processes is decreased, so that the cost of the processes is decreased. In embodiment 3, all processes from the formation of the first metal layer to the definition of the semiconducting layer and the dielectric layer are the same as those in embodiment 1.

Figure 4A:
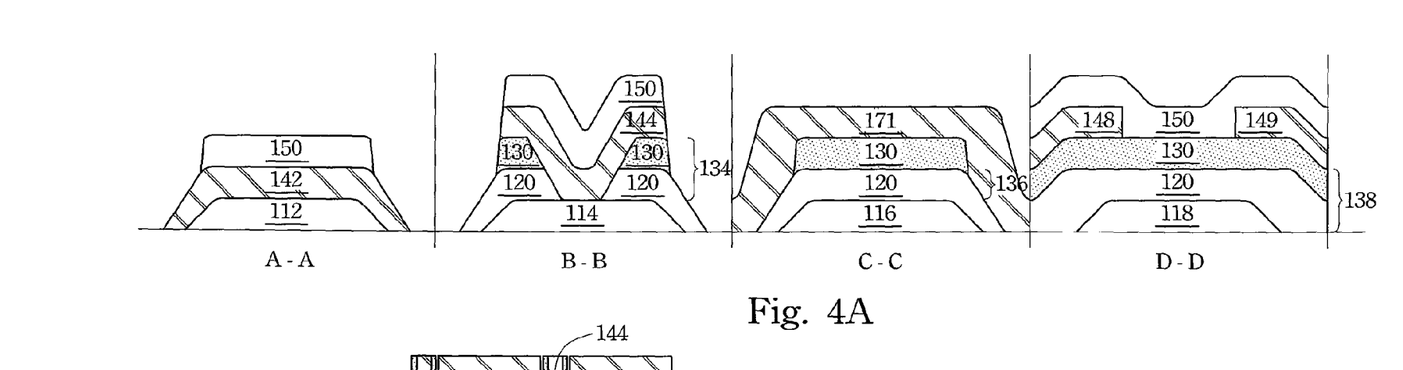
FIG. 4A is a cross-sectional view of the LCD array substrate in process steps according to still another preferred embodiment of this invention.
Figure 4B:
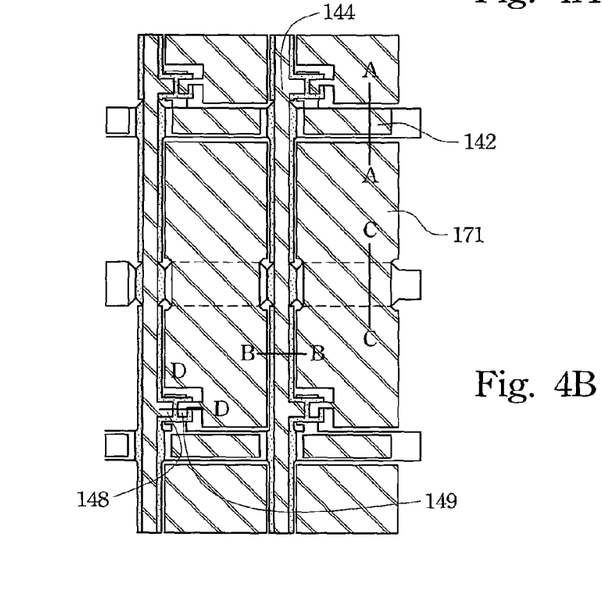
FIG. 4B is a top view of the LCD array substrate in process steps according to still another preferred embodiment of this invention.

Please refer to FIG. 4A and FIG. 4B simultaneously. FIG. 4B is the top view of FIG. 4A. After the transparent conducting layer is formed over the substrate, the transparent conducting layer is defined to form the second scan lines 142, the second data lines 144, the source electrodes 148, the drain electrodes 149 and the pixel electrodes 171. The second scan lines 142 are located on the first scan lines 112. The second data lines 144 are located on the first data lines 114. The source electrodes 148 and the drain electrodes 149 are located at the two sides of the channel layers 138. The pixel electrodes 171 are located on the pixel area. The pixel electrodes 171 on the capacitance dielectric layers 136 can be used as the upper electrodes of the storage capacitances.

Then, a passivation layer 150 is formed over the substrate and defined to cover the second scan lines 142, the second data lines 144, the source electrodes 148 and the drain electrodes 149 to protect the conductive lines and the transistors from oxidizing.

Accordingly, the present invention has the following advantages.

(1) In the LCD array substrate of the invention, the resistance of the conductive lines and the RC delay are reduced, so the display quality of the LCD is improved.

(2) In the LCD array substrate of the invention, the transparency of the pixel areas is increased, so the brightness of the LCD is increased.

The preferred embodiments of the present invention described above should not be regarded as limitations to the present invention. It will be apparent to those skilled in the art that various modifications and variations can be made to the present invention without departing from the scope or spirit of the invention. The scope of the present invention is as defined in the appended claims.

What is claimed is:

1. A LCD array substrate, comprising:
at least a first conductive line on a substrate, wherein the first conductive line has at least a crossing region;
at least two second conductive lines on the substrate, wherein the second conductive lines are separately located at two sides of the crossing region and perpendicular to the first conductive line, and the first conductive line and the second conductive lines define a plurality of pixel areas;
at least a signal dielectric layer on the second conductive lines and on the crossing region, wherein the signal dielectric layer on the second conductive lines has a first opening to expose the second conductive lines, and the signal dielectric layer is not disposed on the pixel areas;
at least two third conductive lines covering the first conductive line at the two side of the crossing region to form a scan line;
at least a fourth conductive line covering the signal dielectric layer and the first opening to form a data line, wherein the third conductive lines don't electrically connect with the fourth conductive line;
at least a transistor, wherein a source electrode of the transistor electrically connects with the fourth conductive line, a gate electrode of the transistor electrically connects with the first conductive line; and at least a pixel electrode, wherein the pixel electrode electrically connects with a drain electrode of the transistor.

2. The substrate of the claim 1, further comprising:

a capacitance line on the substrate and parallel to the first conductive line, wherein the capacitance line is located at the same side of the first conductive line as the gate electrode and doesn't connect with the second conductive lines a capacitance dielectric layer on the capacitance line; and an upper electrode on the capacitance dielectric layer, wherein the upper electrode electrically connects with a drain electrode of the transistor and the pixel electrode.

3. The substrate of the claim 2, further comprising a patterned planarization layer over the substrate, wherein the planarization layer has a second opening to expose the upper electrode.

4. The substrate of the claim 2, wherein the capacitance dielectric layer comprises a dielectric layer and a semiconducting layer.

5. The substrate of the claim 2, wherein the capacitance dielectric layer comprises a dielectric layer.

6. The substrate of the claim 2, wherein a material of the upper electrode is transparent conducting material.

7. The substrate of the claim 2, wherein a material of the upper electrode is metal.

8. The substrate of the claim 1, wherein a material of the first conductive line and the second conductive lines is metal.

9. The substrate of the claim 1, wherein a material of the third conductive lines, the fourth conductive line, the source electrode and the drain electrode is metal.

10. The substrate of the claim 1, wherein a material of the third conductive lines, the fourth conductive line, the source electrode and the drain electrode is transparent conducting material.

11. The substrate of the claim 1, further comprising a passivation layer on the third conductive lines, the fourth conductive line and the transistor.

* * * * *